(12) United States Patent
Acee et al.

(10) Patent No.: US 11,565,802 B2
(45) Date of Patent: Jan. 31, 2023

(54) ROTOR SYSTEMS HAVING LEAD-LAG DAMPER COOLING

(71) Applicant: Textron Innovations Inc., Providence, RI (US)

(72) Inventors: Aaron Alexander Acee, Flower Mound, TX (US); Andrew Thomas Carter, Richland Hills, TX (US); Michael Scott Seifert, Southlake, TX (US); Shahryar Fotovati, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 232 days.

(21) Appl. No.: 17/154,650

(22) Filed: Jan. 21, 2021

(65) Prior Publication Data
US 2022/0227486 A1 Jul. 21, 2022

(51) Int. Cl.
*B64C 27/51* (2006.01)
*F16F 13/08* (2006.01)
*F16F 9/42* (2006.01)

(52) U.S. Cl.
CPC ............... *B64C 27/51* (2013.01); *F16F 9/42* (2013.01); *F16F 13/08* (2013.01)

(58) Field of Classification Search
None
See application file for complete search history.

(56) References Cited

U.S. PATENT DOCUMENTS

| | | | | |
|---|---|---|---|---|
| 4,251,187 | A * | 2/1981 | Hollrock | B64C 27/35 416/134 A |
| 9,284,051 | B2 * | 3/2016 | Amari | B64C 27/35 |
| 10,479,493 | B2 * | 11/2019 | Sequera | B64D 45/00 |
| 2021/0389054 | A1 * | 12/2021 | Welsh | F28D 15/0266 |

* cited by examiner

*Primary Examiner* — Kayla McCaffrey
(74) *Attorney, Agent, or Firm* — Lawrence Youst PLLC (57) ABSTRACT

A rotor system for a rotorcraft includes a rotor hub having a plurality of blade grips coupled thereto. Each blade grip has a rotor blade coupled thereto. A fairing is disposed at least partially around the rotor hub. Each of a plurality of lead-lag dampers is coupled to at least a respective one of the blade grips. Each lead-lag damper has a damper heat exchanger and a fluid pump operably associated therewith. A fairing heat exchanger is in fluid communication with the damper heat exchangers and the fluid pumps. Each lead-lag damper is configured to drive the respective fluid pump responsive to damping operations to pump a cooling fluid from the respective damper heat exchanger to the fairing heat exchanger.

19 Claims, 7 Drawing Sheets

ROTOR SYSTEMS HAVING LEAD-LAG DAMPER COOLING

GOVERNMENT RIGHTS

This invention was made with Government support under Agreement No. W911W6-19-9-0002, awarded by the Army Contracting Command-Redstone Arsenal. The Government has certain rights in the invention.

TECHNICAL FIELD OF THE DISCLOSURE

The present disclosure relates, in general, to articulated rotor systems disposed within aerodynamic fairings operable for use on rotorcraft and, in particular, to rotor systems having lead-lag dampers and a lead-lag damper cooling system for reducing the operating temperature of the lead-lag dampers during damping operations.

BACKGROUND

Main rotor systems of rotorcraft such as helicopters typically include a plurality of rotor blades that are coupled to a rotor hub. Such rotor systems are mounted on a mast atop the helicopter and are configured such that rotation of the rotor system generates vertical lift that supports the weight of the helicopter and lateral thrust that allows the helicopter to engage in forward, backward and sideward flight. One type of main rotor system is an articulated main rotor system in which the rotor blades have three degrees of freedom; namely, blade pitch about a pitch change axis, blade flap about a flapping axis and blade drag about a lead-lag axis. These articulated rotor systems typically include a lead-lag damper coupled between each rotor blade and the rotor hub to ensure dynamic stability of the helicopter under all operating conditions including preventing ground and air resonance.

It has been found, however, that the fluid motion within fluid-elastic or hydraulic lead-lag dampers generates a significant amount of heat which must be dissipated to prevent adverse damper performance. In open hub designs, airflow over the lead-lag dampers during flight is sufficient to keep the lead-lag dampers cool. It has been found, however, that in rotor systems that utilize a fairing over the rotor hub to improve helicopter aerodynamics, there may be insufficient airflow to adequately cool the lead-lag dampers, which may impede the performance of the lead-lag dampers and potentially create an unstable rotor system. Therefore, a need has arisen for an improved articulated rotor system that utilizes an aerodynamic fairing over the rotor hub and has sufficient cooling of the lead-lag dampers.

SUMMARY

In a first aspect, the present disclosure is directed to a rotor system operable for use on a rotorcraft. The rotor system includes a rotor hub having a plurality of blade grips coupled thereto. Each of a plurality of rotor blades is coupled to a respective one of the blade grips. A fairing is disposed at least partially around the rotor hub. Each of a plurality of lead-lag dampers is coupled to at least a respective one of the blade grips with each lead-lag damper having a damper heat exchanger and a fluid pump operably associated therewith. A fairing heat exchanger is in fluid communication with the damper heat exchangers and the fluid pumps. Each lead-lag damper is configured to drive the respective fluid pump responsive to damping operations to pump a cooling fluid from the respective damper heat exchanger to the fairing heat exchanger.

In some embodiments, the fairing may have an aerodynamic shape. In certain embodiments, the fairing heat exchanger may have an upper surface that forms at least a portion of the upper surface to the fairing. In other embodiments, the upper surface of the fairing heat exchanger may be in thermal communication with the upper wall of the fairing. In some embodiments, the fairing heat exchanger may be configured to combine the cooling fluid from each of the damper heat exchangers. In certain embodiments, the fairing heat exchanger may include a plurality of sectors each in fluid communication with a respective one of the damper heat exchangers and a respective one of the fluid pumps. In such embodiments, the plurality of sectors may form an integrated fairing heat exchanger or a distributed fairing heat exchanger.

In some embodiments, each lead-lag damper may have an in-plane spring rate that is operable to provide lead-lag damping to the respective rotor blade. In certain embodiments, each of the lead-lag dampers may be a fluid-elastic damper. In some embodiments, each of the lead-lag dampers may include a housing and a piston that is at least partially disposed within the housing and is displaceable relative to the housing during damping operations. In such embodiments, the respective fluid pump may extract power responsive to the displacement of the piston relative to the housing during damping operations, such extracted power adding to the damping effect of the lead-lag damper. In addition, in such embodiments, the flow rate of the cooling fluid through the respective fluid pump may be proportional to the displacement of the piston relative to the housing during damping operations. In certain embodiments, for each lead-lag damper, the cooling fluid may be independent of a damping fluid. In other embodiments, the cooling fluid may operate as the damping fluid. In some embodiments, each of the lead-lag dampers may be coupled between the respective one of the blade grips and the rotor hub. In other embodiments, each of the lead-lag dampers may be coupled between a trailing side of the respective one of the blade grips and a leading side of an adjacent blade grip.

In a second aspect, the present disclosure is directed to a rotorcraft such as a helicopter. The rotorcraft includes a fuselage, a powertrain including a mast, and a rotor system that is coupled to the powertrain. The rotor system includes a rotor hub that is coupled to the mast and is rotatable therewith. Each of a plurality of blade grips is coupled to the rotor hub. Each of a plurality of rotor blades is coupled to a respective one of the blade grips. A fairing is disposed at least partially around the rotor hub. Each of a plurality of lead-lag dampers is coupled to at least a respective one of the blade grips with each lead-lag damper having a damper heat exchanger and a fluid pump operably associated therewith. A fairing heat exchanger is in fluid communication with the damper heat exchangers and the fluid pumps. Each lead-lag damper is configured to drive the respective fluid pump responsive to damping operations to pump a cooling fluid from the respective damper heat exchanger to the fairing heat exchanger.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Figure 1A:
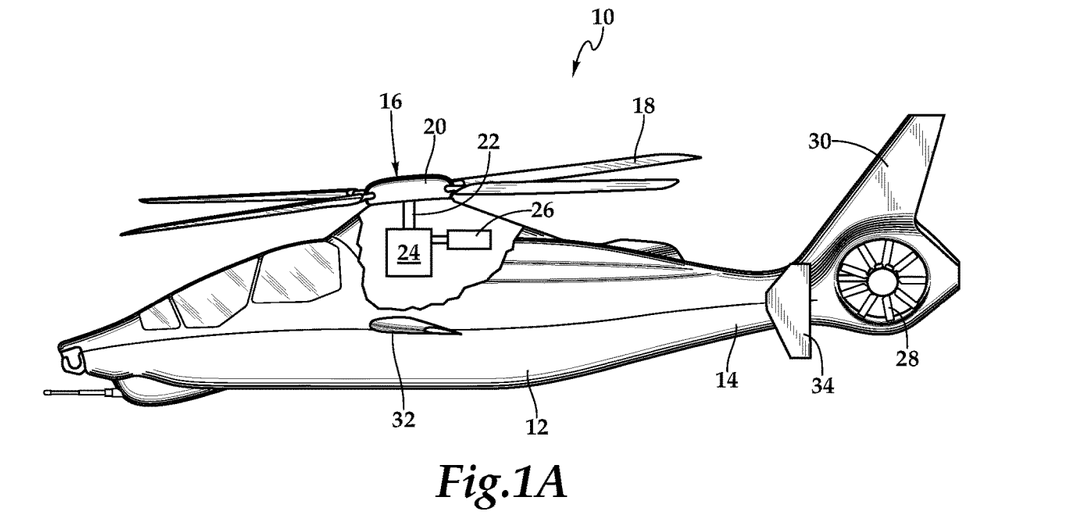
FIGS. 1A-1C are schematic illustrations of a helicopter having a rotor system with a lead-lag damper cooling system in accordance with embodiments of the present disclosure.
Figure 1B:
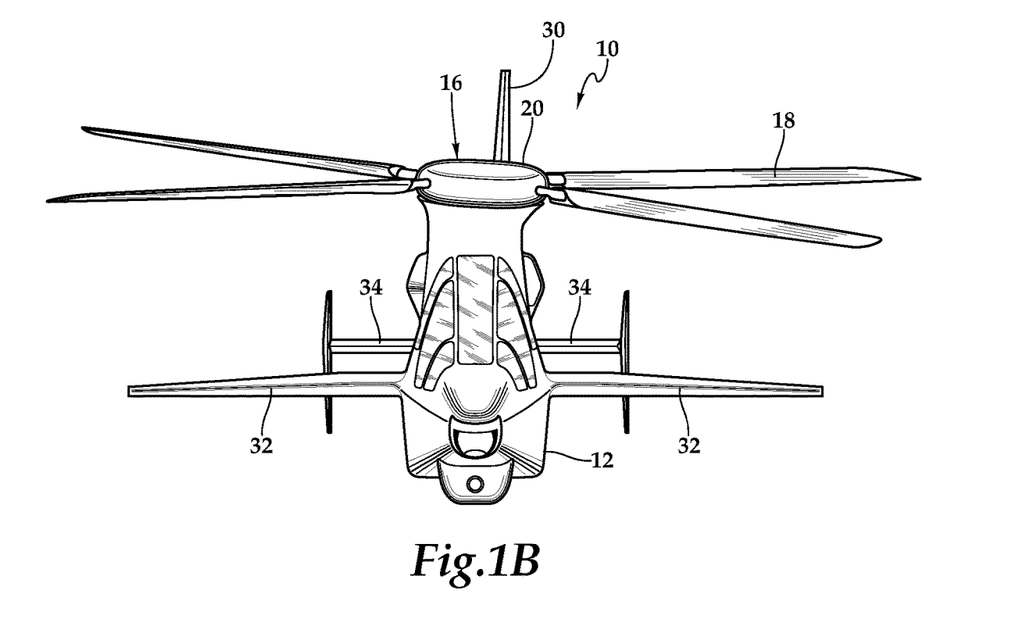
Figure 1C:
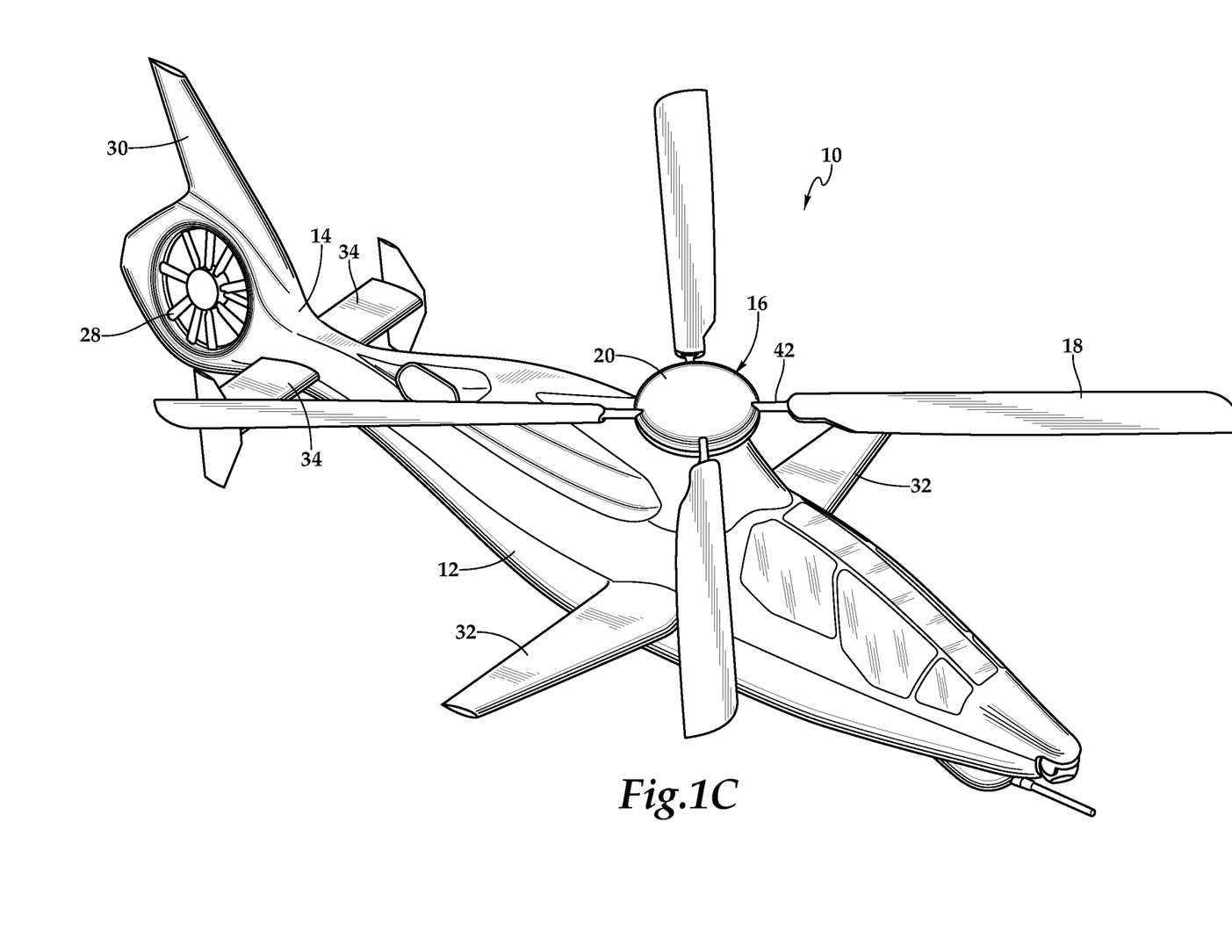

Referring now to FIGS. 1A-1C in the drawings, a rotorcraft depicted as helicopter 10 is schematically illustrated. Helicopter 10 includes a body depicted as fuselage 12 and tailboom 14. The primary propulsion for helicopter 10 is generated by a main rotor system 16. Main rotor system 16 includes a plurality of rotor blades 18 extending radially outward from a main rotor hub disposed within an aerodynamic fairing 20 and including a lead-lag damper cooling system. Main rotor system 16 receives torque and rotational energy from a powertrain that includes a mast 22, a main rotor gearbox 24 and one or more engines 26, such as turbo shaft engines. Main rotor gearbox 24 includes gear systems such as a gear reducing transmission designed to enable optimum engine speed and optimal rotor speed during flight operations. The pitch of rotor blades 18 can be collectively and cyclically manipulated by a pitch control assembly, such as a rise and fall swashplate, to selectively control the direction, thrust and lift of helicopter 10. In the illustrated embodiment, rotor system 16 is a fully articulated rotor system in which each rotor blade 18 has a pitch change degree of freedom about a pitch change axis, a flapping degree of freedom about a flapping axis and a lead-lag degree of freedom about a lead-lag axis.

More specifically, flapping is a result of the dissymmetry of lift produced by the rotor blades at different positions during a single rotation. During rotation, for example, a rotor blade may generate more lift while advancing in the direction of travel of the helicopter than while retreating in the opposite direction. A rotor blade may flap up while advancing in the direction of travel and may flap down while retreating in the opposite direction. Lead-lag refers to the movement of a rotor blade forward and backward about its lead-lag axis. Lead-lag is a capability designed into a fully articulated rotor system to reduce stress on the system caused by flapping. The need for lead-lag capability is a result of the Coriolis effect, or the law of conservation of angular momentum. In particular, as a blade flaps up, the speed of the blade increases due to the movement of the center of mass of the blade toward the axis of rotation. In contrast, as the blade flaps down, the speed of the blade decreases due to the movement of the center of mass of the blade away from the axis of rotation.

Returning to the figures, helicopter 10 includes an anti-torque system depicted as tail rotor 28 that controls the yaw of helicopter 10 by counteracting the torque exerted on fuselage 12 by rotor system 16. In the illustrated embodiment, helicopter 10 includes a vertical tail fin 30 that provide stabilization to helicopter 10 during high speed forward flight. In addition, helicopter 10 includes wing members 32 that extend laterally from fuselage 12 and wing members 34 that extend laterally from tailboom 14. Wing members 32, 34 provide lift to helicopter 10 responsive to the forward airspeed of helicopter 10, thereby reducing the lift requirement on main rotor system 16 and increasing the top speed of helicopter 10.

Even though the rotor system of the present disclosure has been depicted and described as having a particular number of rotor blades, it should be understood by those having ordinary skill in the art that a rotor system of the present disclosure could have alternate numbers of rotor blades both greater than or less than four. Also, even though the rotor system of the present disclosure has been depicted and described as be being the main rotor of a helicopter, it should be understood by those having ordinary skill in the art that the teachings of certain embodiments relating to the rotor systems described herein may apply to other aircraft including, but not limited to, hybrid aircraft, tiltwing aircraft, tiltrotor aircraft, gyrocopters, compound helicopters, quad and multi rotor aircraft, drones and the like. In addition, it should be understood by those having ordinary skill in the art that the teachings of certain embodiments relating to the rotor systems of the present disclosure described herein may apply to both manned and unmanned aircraft.

Figure 2A:
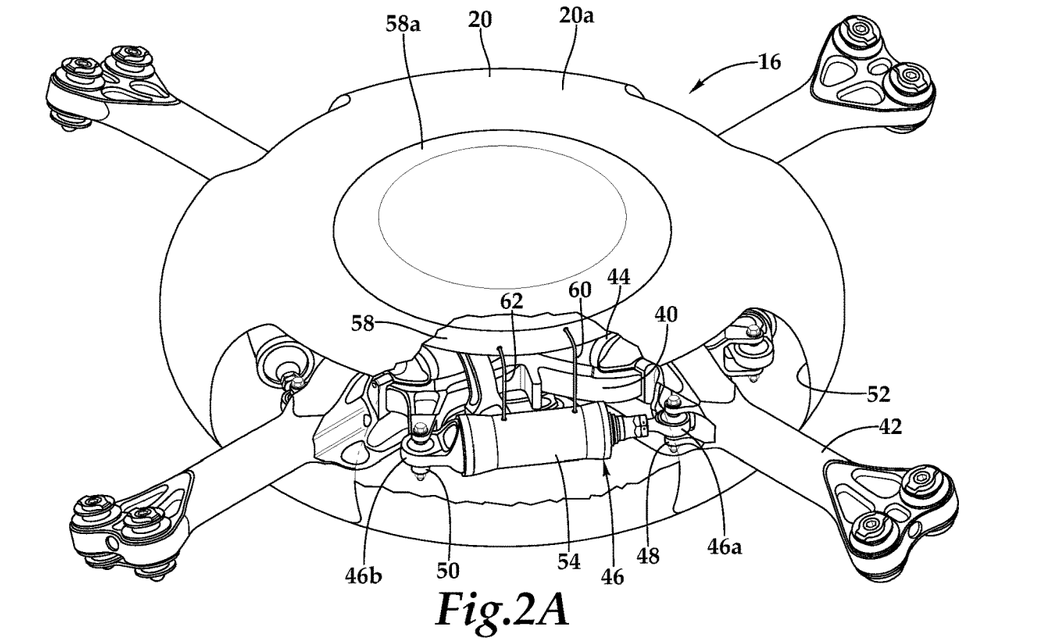
FIGS. 2A-2B are isometric views of rotor systems each with a lead-lag damper cooling system in accordance with embodiments of the present disclosure.

Referring next to FIG. 2A in the drawings, a more detailed view of rotor system 16 with a lead-lag damper cooling system is depicted. In the illustrated embodiment, rotor system 16 includes a rotor hub 40 having four blade grips coupled thereto including blade grip 42, which is representative of each of the blade grips. Blade grip 42 is coupled to rotor hub 40 by a centrifugal force bearing 44 that provides a centrifugal force retention load path from rotor blade 18 (see FIG. 1C) to rotor hub 40 via blade grip 42. Rotor system 16 includes four lead-lag dampers including lead-lag damper 46, which is representative of each of the lead-lag dampers. In the illustrated embodiment, the piston end 46a of lead-lag damper 46 is coupled to a clevis 48 on a trailing side of blade grip 42 and the housing end 46b of lead-lag damper 46 is coupled to a clevis 50 of rotor hub 40. The couplings between lead-lag damper 46 and devises 48, 50 include spherical bearings to allow certain degrees of freedom therebetween which may be utilized during blade pitching and flapping. In the illustrated embodiment, aerodynamic fairing 20 is at least partially disposed around rotor hub 40 and the lead-lag dampers which reduces the airflow around the lead-lag dampers during flight compared to open hub designs. As illustrated, aerodynamic fairing 20 has four clearance windows including clearance window 52, which is representative of each of the clearance windows. Clearance window 52 provides suitable space to allow blade pitch, blade flap and/or blade drag of rotor blade 18 without causing contact between blade grip 42 and aerodynamic fairing 20.

Lead-lag damper 46 has an in-plane spring rate operable to apply a damping force to the lead-lag degree of freedom of rotor blade 18 via blade grip 42 to reduce the in-plane oscillation of rotor blade 18. The stiffness, softness and/or in-plane spring rate of lead-lag damper 46 may be tailored to achieve the desired operational modes based upon the loads and motions expected in the particular application. In one example, lead-lag damper 46 may be a fluid-elastic or hydraulic lead-lag damper with an in-plane spring rate operable to provide lead-lag damping to rotor blade 18 responsive to the movement of a damping fluid and/or the shearing of elastomeric layers as piston end 46a of lead-lag damper 46 translates relative to housing end 46b of lead-lag damper 46. As discussed herein, the fluid and/or elastomeric motion within lead-lag damper 46 generates a significant amount of heat which must be dissipated to prevent adverse damper performance.

Figure 3:
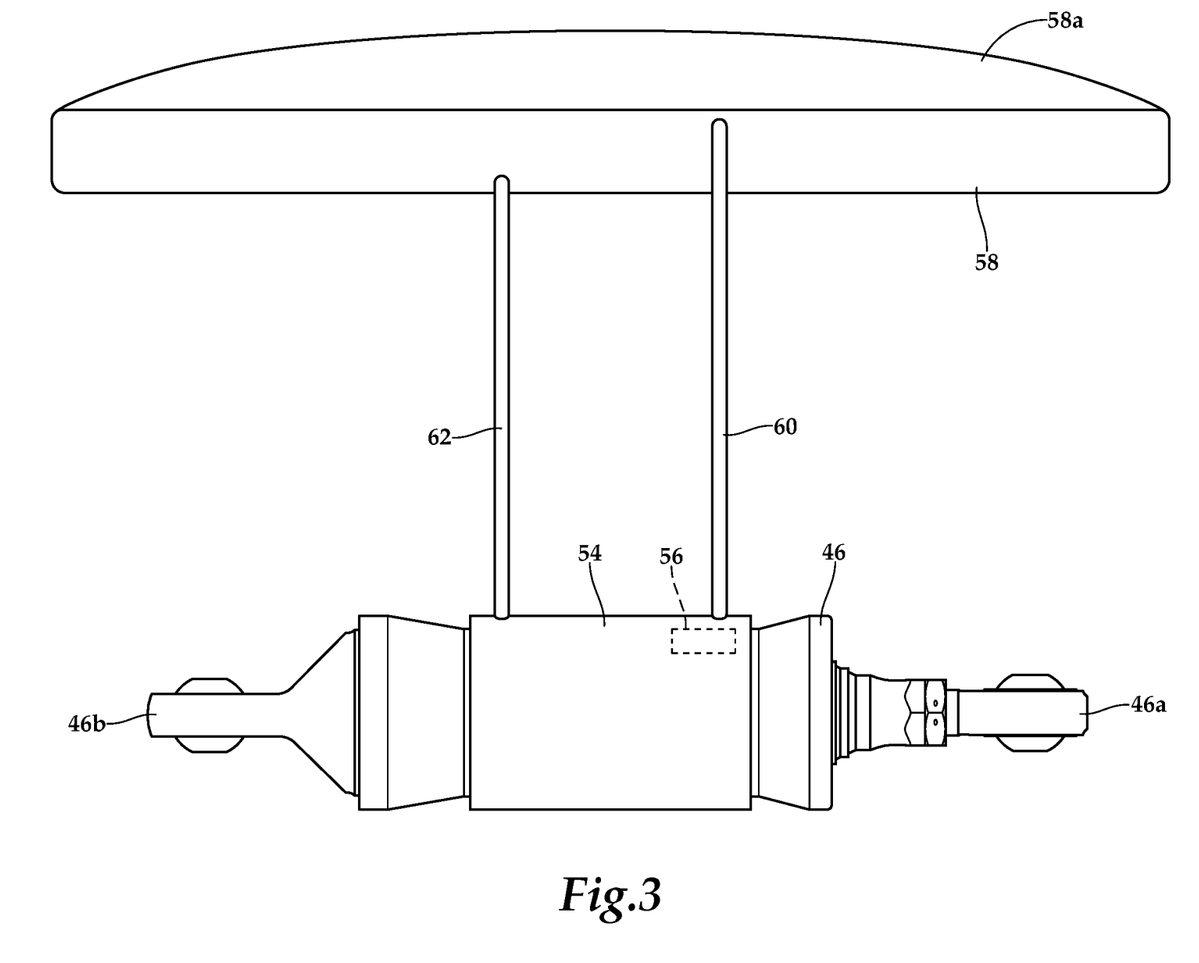
FIG. 3 is a side elevation view of a portion of a lead-lag damper cooling system for a rotor system in accordance with embodiments of the present disclosure.

Referring additionally to FIG. 3 and in accordance with embodiments described herein, a lead-lag damper cooling system is utilized for reducing the operating temperature of the lead-lag dampers during flight to overcome the reduction of airflow around the lead-lag dampers due to their location within aerodynamic fairing 20. In the illustrated embodiment, lead-lag damper 46 includes a damper heat exchanger 54 and a fluid pump 56. Damper heat exchanger 54 is positioned about the housing of lead-lag damper 46 such that damper heat exchanger 54 is in thermal communication with the portion of lead-lag damper 46 that contains the damper fluid chambers and the damping fluid. Damper heat exchanger 54 contains a cooling fluid that is circulated between damper heat exchanger 54 and a fairing heat exchanger 58 by fluid pump 56 which may be positioned within lead-lag damper 46 such as within damper heat exchanger 54, as illustrated, or may be outboard of lead-lag damper 46. The cooling fluid absorbs heat energy generated in lead-lag damper 46 during damping operations and is pumped to fairing heat exchanger 58 via conduit 60. The cooling fluid releases the heat energy as it travels through a fluid circulation system within fairing heat exchanger 58.

In the illustrated embodiment, the upper surface 58a of fairing heat exchanger 58 forms a portion of the upper surface 20a of fairing 20 such that upper surface 58a is directly exposed to airflow during flight which tends to extract heat from fairing heat exchanger 58 and the cooling fluid circulating therein. The cooling fluid is then returned to damper heat exchanger 54 via conduit 62 at a lower temperature such that the cooling fluid can again absorbs heat energy as it travels through a fluid circulation system within damper heat exchanger 54. In the illustrated embodiment, the circulation rate of the cooling fluid is proportional to the displacement and/or rate of displacement of piston end 46a of lead-lag damper 46 relative to housing end 46b of lead-lag damper 46. This is achieved by using the linear translation motion of the piston relative to the housing of lead-lag damper 46 to drive fluid pump 56 with a suitable mechanical linkage. In this manner, the greater the lead-lag motion of rotor blade 18, which tends to generate greater heating in the damping fluid within lead-lag damper 46, the greater the pump rate of fluid pump 56, which tends to provide greater cooling to the damping fluid within lead-lag damper 46 by increasing the circulation rate of the cooling fluid through the lead-lag damper cooling system.

Figure 2B:
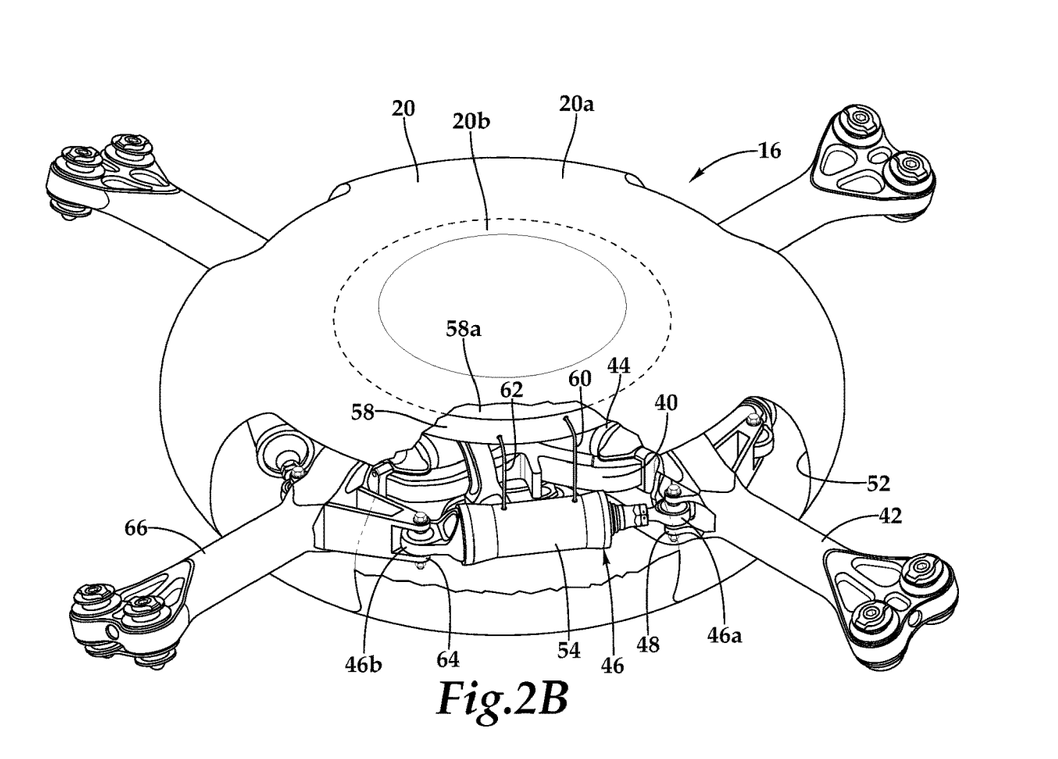

Referring next to FIG. 2B of the drawings, rotor system 16 is depicted with another embodiment of a lead-lag damper cooling system. In the illustrated embodiment, instead of the upper surface of fairing heat exchanger 58 forming a portion of the upper surface of fairing 20, in this case, the upper surface 58a of fairing heat exchanger 58 is in thermal communication with a lower surface of upper wall 20b of fairing 20 such that heat is transferred from fairing heat exchanger 58 to fairing 20, the upper surface 20a of which is directly exposed to airflow during flight which tends to extract heat from fairing 20 and thus from fairing heat exchanger 58 and the cooling fluid circulating therein. In the illustrated embodiment, instead of the lead-lag dampers being coupled between the blade grips and the rotor hub, the piston end 46a of lead-lag damper 46 is coupled to clevis 48 on the trailing side of blade grip 42 and the housing end 46b of lead-lag damper 46 is coupled to a clevis 64 on a leading side of blade grip 66. The couplings between lead-lag damper 46 and clevises 48, 64 include spherical bearings to allow certain degrees of freedom therebetween which may be utilized during blade pitching and flapping. As illustrated, the lead-lag dampers form a blade-to-blade damping ring that utilizes a lead-lag damper cooling system of the present disclosure.

Figure 4A:
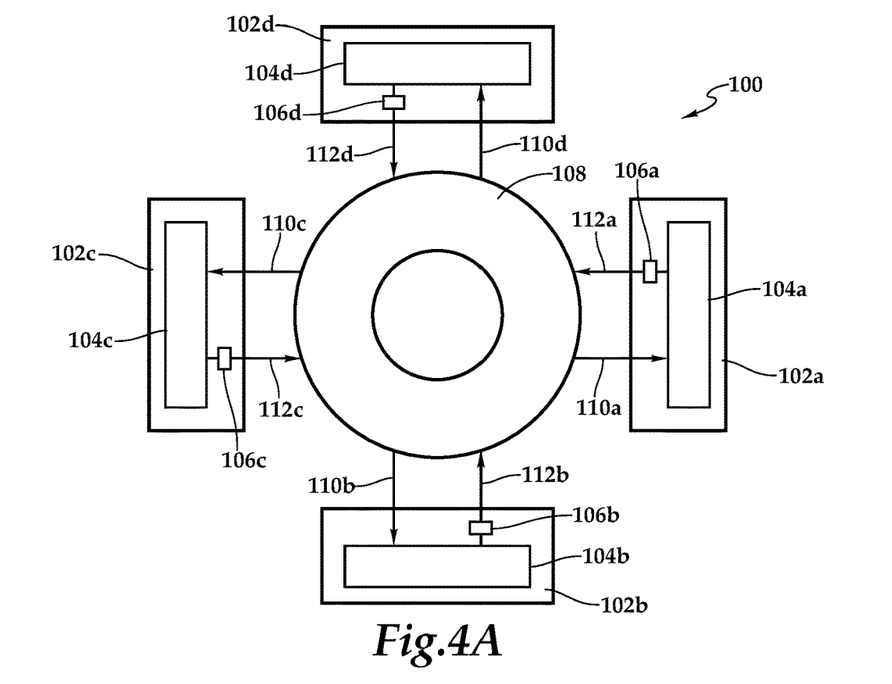
FIGS. 4A-4D are schematic illustrations of lead-lag damper cooling systems for a rotor system in accordance with embodiments of the present disclosure.

Referring next to FIGS. 4A-4D of the drawings, various embodiments of a lead-lag damper cooling system for a rotor system of a rotorcraft are schematically illustrated. In FIG. 4A, a lead-lag damper cooling system 100 includes lead-lag dampers 102a, 102b, 102c, 102d. Lead-lag damper 102a is operably associated with damper heat exchanger 104a and fluid pump 106a, lead-lag damper 102b is operably associated with damper heat exchanger 104b and fluid pump 106b, lead-lag damper 102c is operably associated with damper heat exchanger 104c and fluid pump 106c and lead-lag damper 102d is operably associated with damper heat exchanger 104d and fluid pump 106d. In the illustrated embodiment, fluid pumps 106a, 106b, 106c, 106d are integrated within lead-lag dampers 102a, 102b, 102c, 102d, respectively and are driven by the damping operations thereof, as discussed herein. Lead-lag damper cooling system 100 also includes a fairing heat exchanger 108 that is in fluid communication with fluid pumps 106a, 106b, 106c, 106d and damper heat exchangers 104a, 104b, 104c, 104d via supply lines 110a, 110b, 110c, 110d and return lines 112a, 112b, 112c, 112d, respectively. In the illustrated embodiment, the damping fluid in lead-lag dampers 102a, 102b, 102c, 102d is independent of the cooling fluid circulating in lead-lag damper cooling system 100. In addition, fairing heat exchanger 108 is an integrated fairing heat exchanger in which the cooling fluid circulated therethrough is common to and shared by each of damper heat exchangers 104a, 104b, 104c, 104d.

Figure 4B:
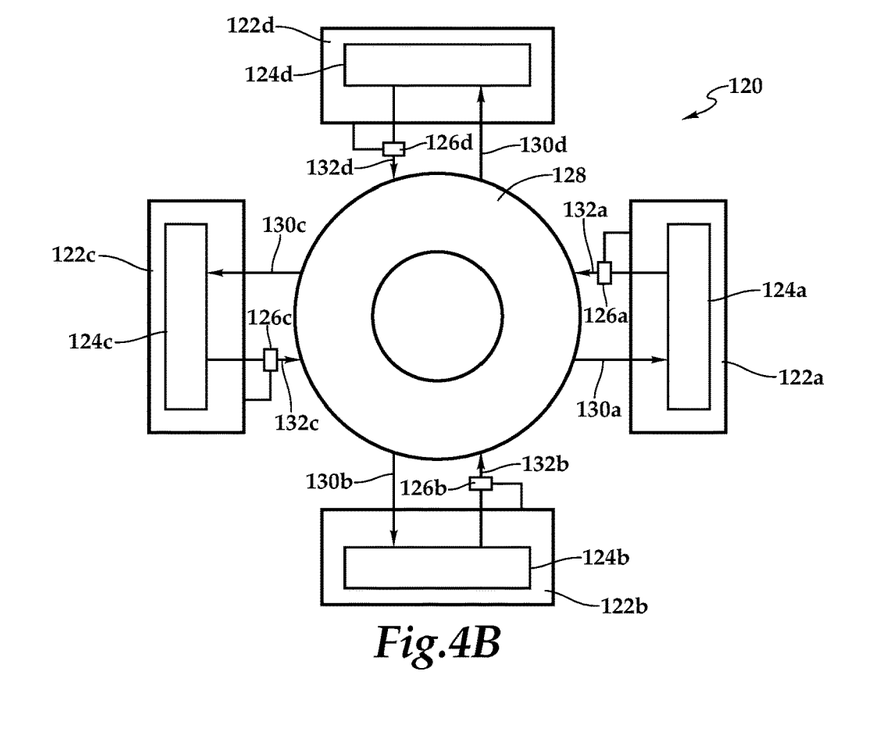

In FIG. 4B, a lead-lag damper cooling system 120 includes lead-lag dampers 122a, 122b, 122c, 122d. Lead-lag damper 122a is operably associated with damper heat exchanger 124a and fluid pump 126a, lead-lag damper 122b is operably associated with damper heat exchanger 124b and fluid pump 126b, lead-lag damper 122c is operably associated with damper heat exchanger 124c and fluid pump 126c and lead-lag damper 122d is operably associated with damper heat exchanger 124d and fluid pump 126d. In the illustrated embodiment, fluid pumps 126a, 126b, 126c, 126d are outboard of respectively lead-lag dampers 122a, 122b, 122c, 122d and are driven by the damping operations thereof or by other suitable means. Lead-lag damper cooling system 120 also includes a fairing heat exchanger 128 that is in fluid communication with fluid pumps 126a, 126b, 126c, 126d and damper heat exchangers 124a, 124b, 124c, 124d via supply lines 130a, 130b, 130c, 130d and return lines 132a, 132b, 132c, 132d, respectively. In the illustrated embodiment, the damping fluid in lead-lag dampers 122a, 122b, 122c, 122d is independent of the cooling fluid circulating in lead-lag damper cooling system 120. In addition, fairing heat exchanger 128 is an integrated fairing heat exchanger in which the cooling fluid circulated therethrough is common to and shared by each of damper heat exchangers 124a, 124b, 124c, 124d.

Figure 4C:
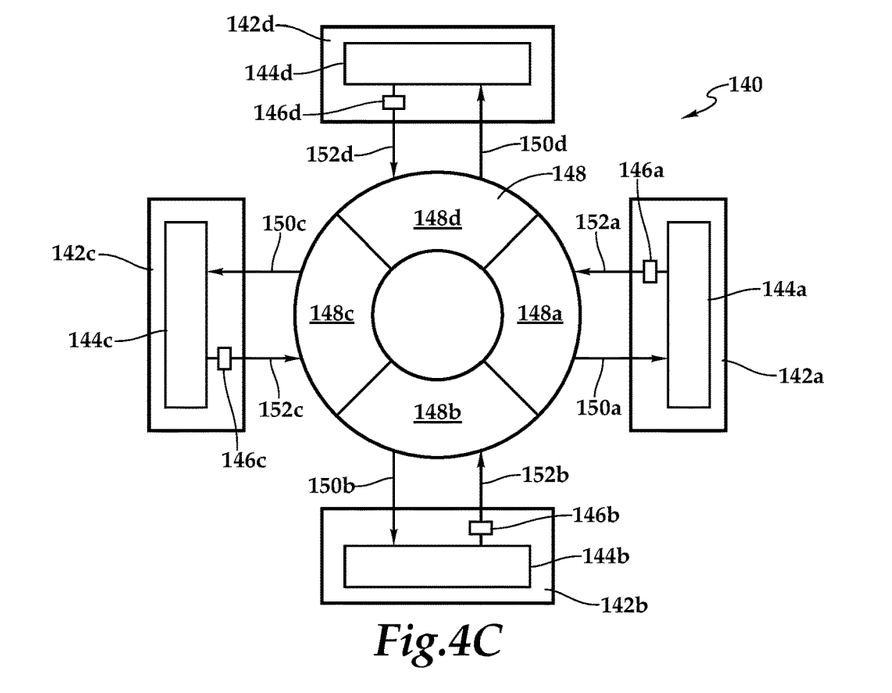

In FIG. 4C, a lead-lag damper cooling system 140 includes lead-lag dampers 142a, 142b, 142c, 142d. Lead-lag damper 142a is operably associated with damper heat exchanger 144a and fluid pump 146a, lead-lag damper 142b is operably associated with damper heat exchanger 144b and fluid pump 146b, lead-lag damper 142c is operably associated with damper heat exchanger 144c and fluid pump 146c and lead-lag damper 142d is operably associated with damper heat exchanger 144d and fluid pump 146d. In the illustrated embodiment, fluid pumps 146a, 146b, 146c, 146d are integrated within lead-lag dampers 142a, 142b, 142c, 142d, respectively and are driven by the damping operations thereof, as discussed herein. Lead-lag damper cooling system 140 also includes a fairing heat exchanger 148 that is in fluid communication with fluid pumps 146a, 146b, 146c, 146d and damper heat exchangers 144a, 144b, 144c, 144d via supply lines 150a, 150b, 150c, 150d and return lines 152a, 152b, 152c, 152d, respectively. In the illustrated embodiment, the damping fluid in lead-lag dampers 142a, 142b, 142c, 142d may be independent of the cooling fluid circulating in lead-lag damper cooling system 140 or the cooling fluid may also serve as the damping fluid in lead-lag dampers 142a, 142b, 142c, 142d. In addition, fairing heat exchanger 148 is an integrated fairing heat exchanger having independent sectors 148a, 148b, 148c, 148d in which the cooling fluid circulated to each of damper heat exchangers 144a, 144b, 144c, 144d is independent of and not mixed with the cooling fluid circulated to the other of damper heat exchangers 144a, 144b, 144c, 144d.

Figure 4D:
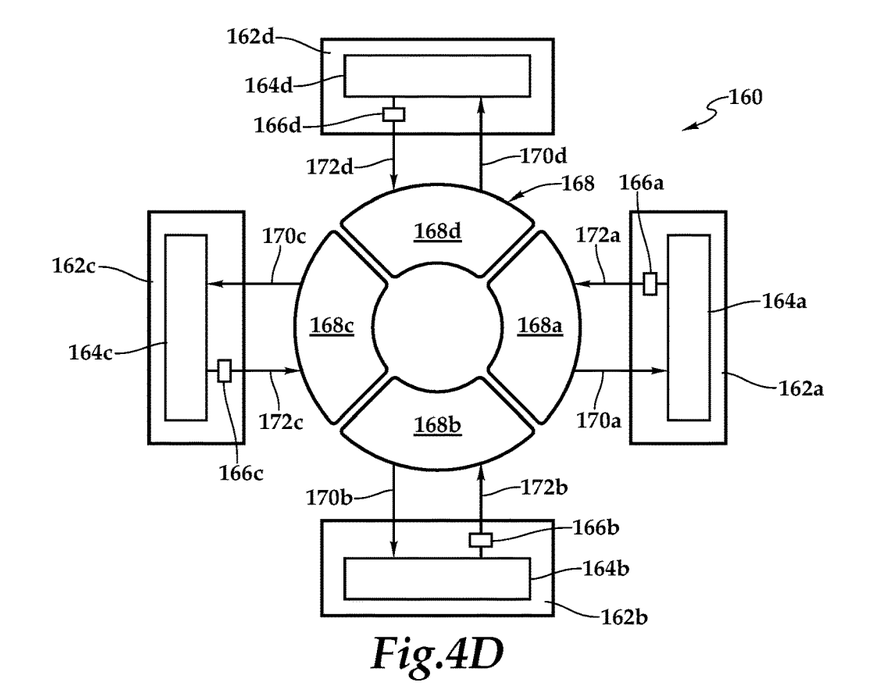

In FIG. 4D, a lead-lag damper cooling system 160 includes lead-lag dampers 162a, 162b, 162c, 162d. Lead-lag damper 162a is operably associated with damper heat exchanger 164a and fluid pump 166a, lead-lag damper 162b is operably associated with damper heat exchanger 164b and fluid pump 166b, lead-lag damper 162c is operably associated with damper heat exchanger 164c and fluid pump 166c and lead-lag damper 162d is operably associated with damper heat exchanger 164d and fluid pump 166d. In the illustrated embodiment, fluid pumps 166a, 166b, 166c, 166d are integrated within lead-lag dampers 162a, 162b, 162c, 162d, respectively and are driven by the damping operations thereof, as discussed herein. Lead-lag damper cooling system 160 also includes a fairing heat exchanger 168 that is in fluid communication with fluid pumps 166a, 166b, 166c, 166d and damper heat exchangers 164a, 164b, 164c, 164d via supply lines 170a, 170b, 170c, 170d and return lines 172a, 172b, 172c, 172d, respectively. In the illustrated embodiment, the damping fluid in lead-lag dampers 162a, 162b, 162c, 162d may be independent of the cooling fluid circulating in lead-lag damper cooling system 160 or the cooling fluid may also serve as the damping fluid in lead-lag dampers 162a, 162b, 162c, 162d. In addition, fairing heat exchanger 168 is a distributed fairing heat exchanger having independent sectors 168a, 168b, 168c, 168d in which the cooling fluid circulated to each of damper heat exchangers 164a, 164b, 164c, 164d is independent of and not mixed with the cooling fluid circulated to the other of damper heat exchangers 164a, 164b, 164c, 164d.

Figure 5A:
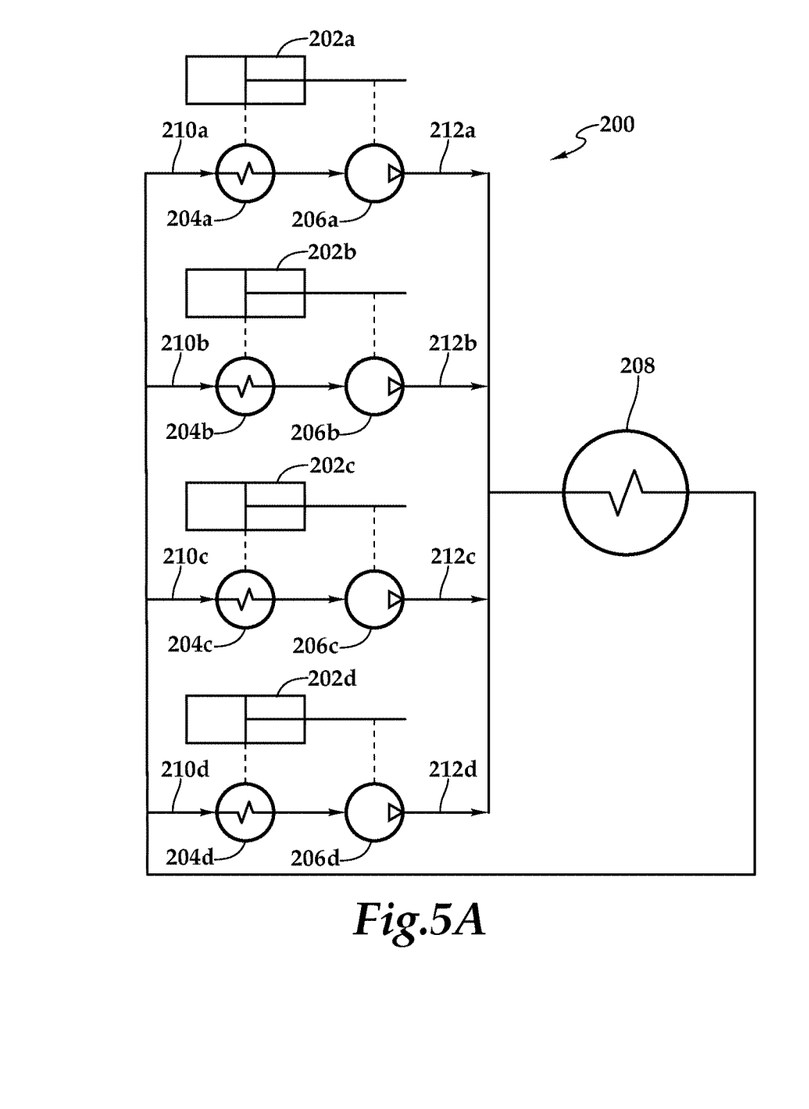
FIGS. 5A-5B are mechanical and fluid flow diagrams of lead-lag damper cooling systems for a rotor system in accordance with embodiments of the present disclosure.
Figure 5B:
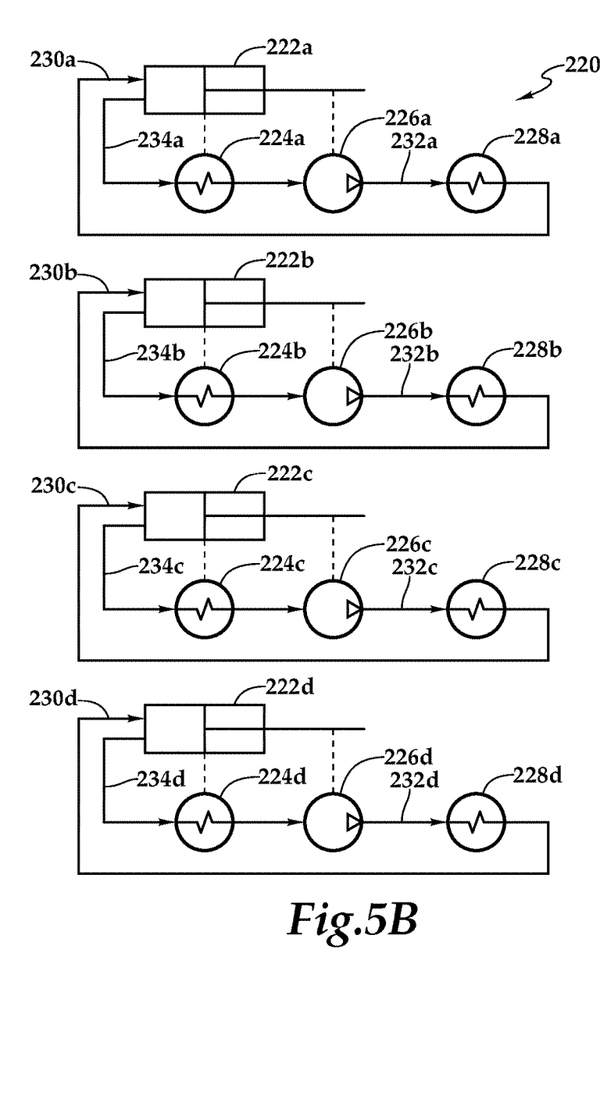

Referring next to FIGS. 5A-5B of the drawings, various embodiments of a lead-lag damper cooling system for a rotor system of a rotorcraft are presented as mechanical and fluid flow diagrams. In FIG. 5A, a lead-lag damper cooling system 200 includes lead-lag dampers 202a, 202b, 202c, 202d. Lead-lag damper 202a is operably associated with and in thermal communication with damper heat exchanger 204a as indicated by the dashed line between the housing of lead-lag damper 202a and damper heat exchanger 204a. Lead-lag damper 202a is operably associated with and mechanically linked to fluid pump 206a as indicated by the dashed line between the piston of lead-lag damper 202a and fluid pump 206a. Lead-lag damper 202b is operably associated with and in thermal communication with damper heat exchanger 204b as indicated by the dashed line between the housing of lead-lag damper 202b and damper heat exchanger 204b. Lead-lag damper 202b is operably associated with and mechanically linked to fluid pump 206b as indicated by the dashed line between the piston of lead-lag damper 202b and fluid pump 206b. Lead-lag damper 202c is operably associated with and in thermal communication with damper heat exchanger 204c as indicated by the dashed line between the housing of lead-lag damper 202c and damper heat exchanger 204c. Lead-lag damper 202c is operably associated with and mechanically linked to fluid pump 206c as indicated by the dashed line between the piston of lead-lag damper 202c and fluid pump 206c. Lead-lag damper 202d is operably associated with and in thermal communication with damper heat exchanger 204d as indicated by the dashed line between the housing of lead-lag damper 202d and damper heat exchanger 204d. Lead-lag damper 202d is operably associated with and mechanically linked to fluid pump 206d as indicated by the dashed line between the piston of lead-lag damper 202d and fluid pump 206d.

In the illustrated embodiment, fluid pumps 206a, 206b, 206c, 206d may be integrated within or outboard of lead-lag dampers 202a, 202b, 202c, 202d, respectively and are driven by the damping operations thereof, as indicated by the dashed lines between respective fluid pumps 206a, 206b, 206c, 206d and the pistons of lead-lag dampers 202a, 202b, 202c, 202d. Lead-lag damper cooling system 200 also includes a fairing heat exchanger 208 that is in fluid communication with damper heat exchangers 204a, 204b, 204c, 204d via supply lines 210a, 210b, 210c, 210d, respectively and in fluid communication with fluid pumps 206a, 206b, 206c, 206d via return lines 212a, 212b, 212c, 212d, respectively. In the illustrated embodiment, the damping fluid in lead-lag dampers 202a, 202b, 202c, 202d is independent of the cooling fluid circulating in lead-lag damper cooling system 200. In addition, fairing heat exchanger 208 is an integrated fairing heat exchanger in which the cooling fluid circulated therethrough is common to and shared by each of damper heat exchangers 204a, 204b, 204c, 204d.

In FIG. 5B, a lead-lag damper cooling system 220 includes lead-lag dampers 222a, 222b, 222c, 222d. Lead-lag damper 222a is operably associated with and in thermal communication with damper heat exchanger 224a as indicated by the dashed line between the housing of lead-lag damper 222a and damper heat exchanger 224a. Lead-lag damper 222a is operably associated with and mechanically linked to fluid pump 226a as indicated by the dashed line between the piston of lead-lag damper 222a and fluid pump 226a. Lead-lag damper 222b is operably associated with and in thermal communication with damper heat exchanger 224b as indicated by the dashed line between the housing of lead-lag damper 222b and damper heat exchanger 224b. Lead-lag damper 222b is operably associated with and mechanically linked to fluid pump 226b as indicated by the dashed line between the piston of lead-lag damper 222b and fluid pump 226b. Lead-lag damper 222c is operably associated with and in thermal communication with damper heat exchanger 224c as indicated by the dashed line between the housing of lead-lag damper 222c and damper heat exchanger 224c. Lead-lag damper 222c is operably associated with and mechanically linked to fluid pump 226c as indicated by the dashed line between the piston of lead-lag damper 222c and fluid pump 226c. Lead-lag damper 222d is operably associated with and in thermal communication with damper heat exchanger 224d as indicated by the dashed line between the housing of lead-lag damper 222d and damper heat exchanger 224d. Lead-lag damper 222d is operably associated with and mechanically linked to fluid pump 226d as indicated by the dashed line between the piston of lead-lag damper 222d and fluid pump 226d.

In the illustrated embodiment, fluid pumps 226a, 226b, 226c, 226d may be integrated within or outboard of lead-lag dampers 222a, 222b, 222c, 222d, respectively and are driven by the damping operations thereof, as indicated by the dashed lines between respective fluid pumps 226a, 226b, 226c, 226d and the pistons of lead-lag dampers 222a, 222b, 222c, 222d. Lead-lag damper cooling system 220 also includes a distributed fairing heat exchanger having independent sectors 228a, 228b, 228c, 228d that are in fluid communication with lead-lag dampers 222a, 222b, 222c, 222d via supply lines 230a, 230b, 230c, 230d and in fluid communication with fluid pumps 226a, 226b, 226c, 226d via return lines 232a, 232b, 232c, 232d, respectively. In addition, lead-lag dampers 222a, 222b, 222c, 222d are in fluid communication with damper heat exchangers 224a, 224b, 224c, 224d, respectively via fluid lines 234a, 234b, 234c, 234d. In the illustrated embodiment, the cooling fluid in each cooling circuit serves as the damping fluid for the respective lead-lag damper 222a, 222b, 222c, 222d. In addition, as the fairing heat exchanger is a distributed fairing heat exchanger, the cooling fluid circulated to each of lead-lag dampers 222a, 222b, 222c, 222d is independent of and not mixed with the cooling fluid circulated to the other of lead-lag dampers 222a, 222b, 222c, 222d.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor system for a rotorcraft, the rotor system comprising:
a rotor hub;
a plurality of blade grips coupled to the rotor hub;
a plurality of rotor blades each coupled to a respective one of the blade grips;
a fairing disposed at least partially around the rotor hub;
a plurality of lead-lag dampers each coupled to at least a respective one of the blade grips, each lead-lag damper having a damper heat exchanger and a fluid pump operably associated therewith; and
a fairing heat exchanger in fluid communication with the damper heat exchangers and the fluid pumps;
wherein, each lead-lag damper is configured to drive the respective fluid pump responsive to damping operations to pump a cooling fluid from the respective damper heat exchanger to the fairing heat exchanger.

2. The rotor system as recited in claim 1, wherein the fairing has an upper surface, wherein the fairing heat exchanger has an upper surface and wherein the upper surface of the fairing heat exchanger forms a portion of the upper surface of the fairing.

3. The rotor system as recited in claim 1, wherein the fairing has an upper wall, wherein the fairing heat exchanger has an upper surface and wherein the upper surface of the fairing heat exchanger is in thermal communication with the upper wall of the fairing.

4. The rotor system as recited in claim 1, wherein the fairing heat exchanger is configured to combine the cooling fluid from each of the damper heat exchangers.

5. The rotor system as recited in claim 1, wherein the fairing heat exchanger further comprises a plurality of sectors each in fluid communication with a respective one of the damper heat exchangers and a respective one of the fluid pumps.

6. The rotor system as recited in claim 5, wherein the plurality of sectors forms an integrated fairing heat exchanger.

7. The rotor system as recited in claim 5, wherein the plurality of sectors forms a distributed fairing heat exchanger.

8. The rotor system as recited in claim 1, wherein each lead-lag damper further comprises an in-plane spring rate operable to provide lead-lag damping to the respective rotor blade.

9. The rotor system as recited in claim 1, wherein each lead-lag damper is a fluid-elastic damper.

10. The rotor system as recited in claim 1, wherein each lead-lag damper further comprises a housing and a piston at least partially disposed within the housing and displaceable relative to the housing during damping operations.

11. The rotor system as recited in claim 10, wherein, for each lead-lag damper, the respective fluid pump extracts power responsive to the displacement of the piston relative to the housing during damping operations.

12. The rotor system as recited in claim 11, wherein, for each fluid pump, a flow rate of the cooling fluid therethrough is proportional to the displacement of the piston relative to the housing during damping operations of the respective lead-lag damper.

13. The rotor system as recited in claim 11, wherein, for each lead-lag damper, the power extracted by the respective fluid pump adds to a damping effect.

14. The rotor system as recited in claim 1, wherein, for each lead-lag damper, the cooling fluid is independent of a damping fluid.

15. The rotor system as recited in claim 1, wherein, for each lead-lag damper, the cooling fluid operates as a damping fluid.

16. The rotor system as recited in claim 1, wherein each of the lead-lag dampers is coupled between the respective one of the blade grips and the rotor hub.

17. The rotor system as recited in claim 1, wherein each of the lead-lag dampers is coupled between a trailing side of the respective one of the blade grips and a leading side of an adjacent blade grip.

18. A rotorcraft comprising:
a fuselage;
a powertrain disposed at least partially within the fuselage and including a mast; and
a rotor system coupled to the powertrain, the rotor system including:
a rotor hub coupled to the mast and rotatable therewith;
a plurality of blade grips coupled to the rotor hub;
a plurality of rotor blades each coupled to a respective one of the blade grips;
a fairing disposed at least partially around the rotor hub;
a plurality of lead-lag dampers each coupled to at least a respective one of the blade grips, each lead-lag damper having a damper heat exchanger and a fluid pump operably associated therewith; and
a fairing heat exchanger in fluid communication with the damper heat exchangers and the fluid pumps;
wherein, each lead-lag damper is configured to drive the respective fluid pump responsive to damping operations to pump a cooling fluid from the respective damper heat exchanger to the fairing heat exchanger.

19. The rotorcraft as recited in claim 18, wherein the rotorcraft is a helicopter.

* * * * *